(12) United States Patent
Fader et al.

(10) Patent No.: US 7,624,973 B2
(45) Date of Patent: Dec. 1, 2009

(54) DYNAMIC PIERCE POINT CENTERING SPRING SEAT

(75) Inventors: Joseph A. Fader, Brighton, MI (US); Mark Christopher Smith, Troy, MI (US); Paul Kurt Miska, Farmington Hills, MI (US); Muhammad Salim, Windsor (CA); Stephen Heagle, Rockwood (CA); Darryl Sendrea, Brampton (CA); Nathan Clark, Macomb, MI (US); Evan Moen, Clarkston, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 617 days.

(21) Appl. No.: 11/299,569

(22) Filed: Dec. 12, 2005

(65) Prior Publication Data

US 2007/0131501 A1 Jun. 14, 2007

(51) Int. Cl.
*F16F 1/12* (2006.01)
(52) U.S. Cl. .................................................. 267/179
(58) Field of Classification Search ................. 267/179, 267/200, 166–180; 280/124.155, 124.151, 280/124.147, 86.752
See application file for complete search history.

(56) References Cited

U.S. PATENT DOCUMENTS

| | | | | |
|---|---|---|---|---|
| 4,094,280 A | * | 6/1978 | Updike | 123/90.3 |
| 4,562,997 A | * | 1/1986 | Iwata et al. | 267/221 |
| 4,720,087 A | | 1/1988 | Duclos | |
| 4,738,434 A | | 4/1988 | Marjoram | |
| 4,830,395 A | * | 5/1989 | Foley | 280/124.162 |
| 5,246,215 A | * | 9/1993 | Takamura et al. | 267/170 |
| 5,984,283 A | * | 11/1999 | Tsuiki et al. | 267/33 |
| 5,984,286 A | * | 11/1999 | Busch et al. | 267/218 |
| 6,378,851 B1 | | 4/2002 | McGuire | |
| 6,705,438 B2 | | 3/2004 | Ananthanarayanan | |
| 6,883,651 B2 | * | 4/2005 | Fukaya | 188/322.12 |
| 2003/0020221 A1 | * | 1/2003 | Pare | 267/179 |

FOREIGN PATENT DOCUMENTS

| | | | |
|---|---|---|---|
| EP | 1469212 A1 | | 10/2004 |
| JP | 62251219 A | * | 11/1987 |
| WO | 03010014 A | | 2/2003 |

OTHER PUBLICATIONS

European Search Report dated Oct. 3, 2007.

* cited by examiner

*Primary Examiner*—Xuan Lan Nguyen
(74) *Attorney, Agent, or Firm*—Carlson, Gaskey & Olds

(57) ABSTRACT

A shock absorber assembly includes a coil spring that reacts between first and second spring seats. The first spring seat is fixed to a shock cylinder and the second spring seat is fixed to a rod that is slidably received within the shock cylinder. An isolator is positioned between an end coil of the spring and at least one of the first and second spring seats. The isolator comprises an annular ring that defines a cavity that is at least partially filled with fluid. The isolator evenly distributes non-centered spring end forces through the fluid to reduce the effects of side load forces.

2 Claims, 3 Drawing Sheets

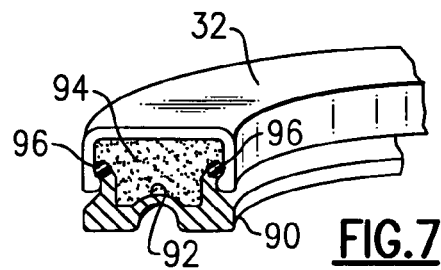
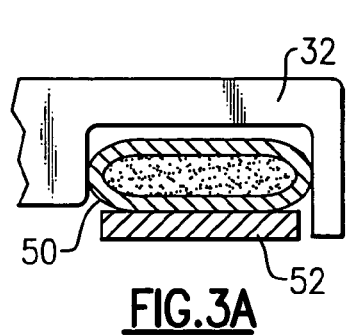
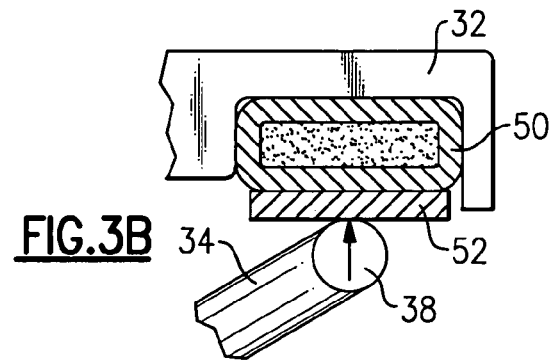
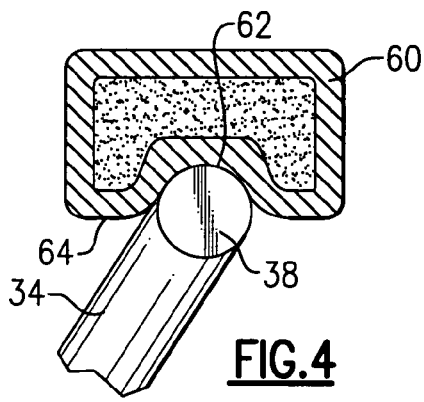
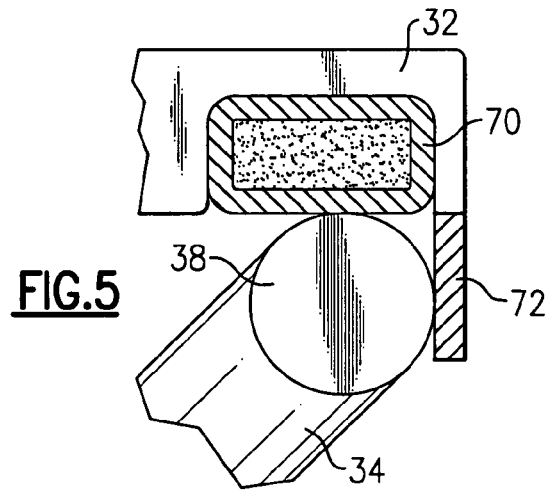
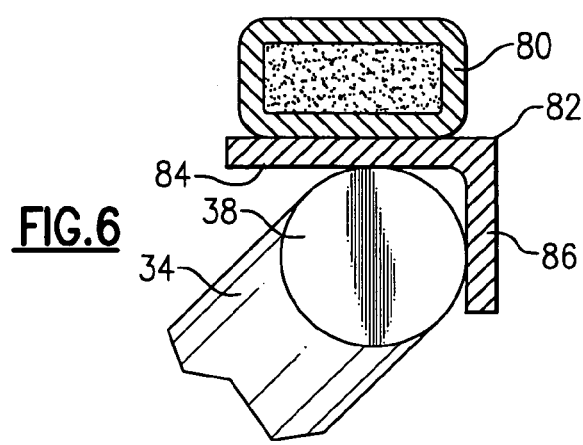

DYNAMIC PIERCE POINT CENTERING SPRING SEAT

TECHNICAL FIELD

A shock absorber assembly or a spring and isolator assembly includes a fluid isolator positioned between a spring end coil and a spring seat to dynamically compensate for side load forces.

BACKGROUND OF THE INVENTION

Shock absorber assemblies react between a vehicle frame and vehicle wheel to reduce vibration and shock load inputs and improve ride comfort. A typical shock absorber assembly includes a cylinder that slidably receives a piston coupled to a rod. One end of the rod is mounted to the vehicle frame and the cylinder is mounted to a vehicle wheel structure. A coil spring reacts between a first spring seat on the cylinder and a second spring seat on the rod.

Side loads generated by the coil spring can cause wear and increased levels of friction between the rod and associated cylinder bearings and seals. This can lead to premature failure of the shock absorber assembly.

Further, coil ends of the coil spring can vary from desired configurations. It is preferred to maintain a center of load, i.e. spring pierce point, to be concentric with the rod. However, the coil ends are typically provided with non-parallel coil end planes, which results in dynamically varying spring pierce points. The interface between the coil ends and associated spring seats can often result in non-uniform distribution of load into the spring seats. This can cause the spring pierce point to move out of a desired location, increasing stress on other shock components.

One proposed solution utilizes an adjustable spring seat that allows the spring pierce point to be set for a desired shock absorber operational position, prior to installation in a vehicle. This adjustable spring seat is disclosed in co-pending application Ser. No. 11/327,107, which is assigned to the assignee of the present invention, titled "Static Pierce Point Centering Spring Seat." While this system has advantages, there is still a need for a system that can dynamically adjust spring pierce point position during vehicle operation to further reduce the effects of side loads.

SUMMARY OF THE INVENTION

A shock absorber assembly or a spring and isolator assembly includes an isolator that distributes non-centered spring end forces through a fluid medium to reduce effects of spring side load forces. The isolator comprises an annular ring that includes a fluid cavity, which is positioned between an end coil of a spring and a spring seat. Optionally, an annular ring can be positioned between each end coil of the spring and an associated spring seat.

In one example, the isolator comprises an annular ring with an internal cavity that is completely enclosed within the annular ring. When the annular ring is subjected to non-centered spring forces, an internal pressure is generated within the annular ring. This internal pressure results in an axial force against a properly positioned spring seat to reduce spring side load forces. When the spring seat is properly positioned, a spring pierce point is maintained near a center of the spring, which is desirable. The spring pierce point comprises a center of load at the spring seat. Reaction members can optionally be placed between the end coils and annular ring to more evenly transfer loading to the annular ring.

In another example, the isolator comprises an annular ring that cooperates with a spring seat to define an internal cavity. A sealing bead, similar to sealing bead formed on a tire for engagement with a rim, is formed about the annular ring. The sealing bead engages the spring seat to provide a sealed fluid cavity that is filled with fluid. A non-uniform force pattern generated by the end coils due to side load forces is transferred into the fluid, and is evenly distributed out to the associated spring seat. This allows the spring seat to tilt and neutralize natural spring loads and off-center pierce points, i.e. off-centering loading at the spring seat.

The subject invention provides a shock absorber assembly that utilizes a fluid filled isolator to dynamically adjust relative loading positions between spring end coils and associated spring seats. The fluid filled isolator functions to maintain a spring pierce point generally concentric with a shock rod to reduce the effects of side loading during vehicle operation. This reduces stress on other components of the shock absorber assembly.

These and other features of the present invention can be best understood from the following specification and drawings, the following of which is a brief description.

BRIEF DESCRIPTION OF THE DRAWINGS

FIG. 3A is a schematic view, shown in partial cross-section, of another embodiment of the subject invention in a non-loaded position.

FIG. 3B is the embodiment of FIG. 3A shown in a loaded position.

FIG. 4 is a schematic view, shown in partial cross-section, of another embodiment of the subject invention.

FIG. 5 is a schematic view, shown in partial cross-section, of another embodiment of the subject invention.

FIG. 6 is a schematic view, shown in partial cross-section, of another embodiment of the subject invention.

FIG. 7 is a perspective view, shown in partial cross-section, of another embodiment of the subject invention.

DETAILED DESCRIPTION OF THE PREFERRED EMBODIMENT

Figure 1:
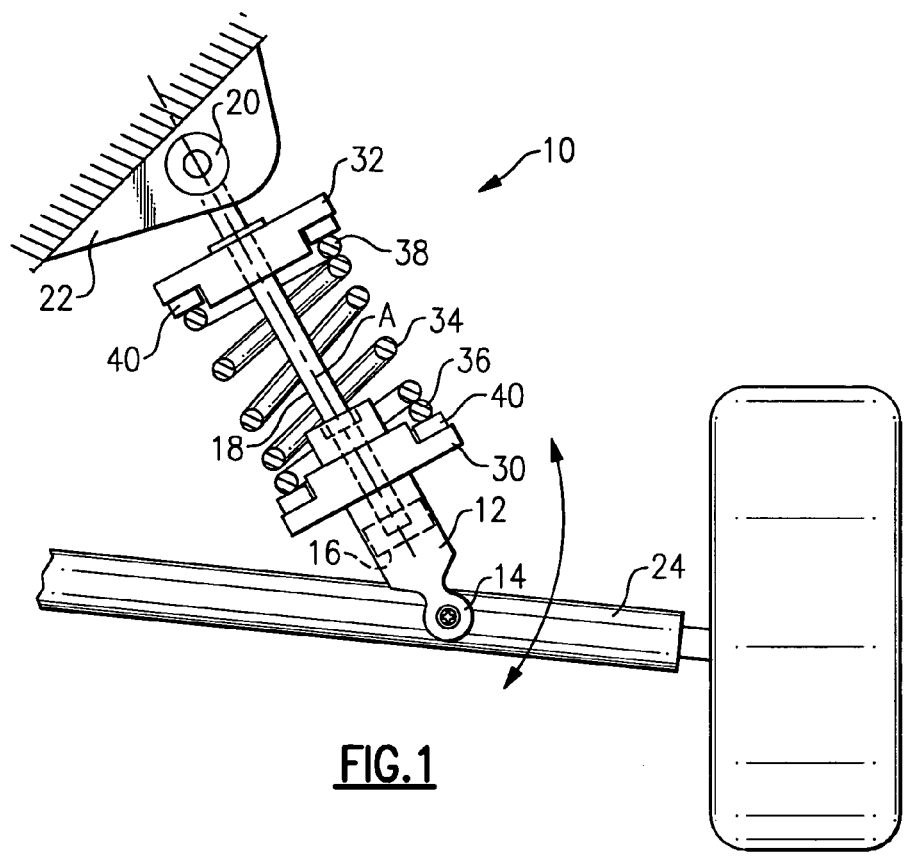
FIG. 1 is a schematic front view of a shock absorber assembly incorporating the subject invention.

FIG. 1 shows a shock absorber 10 including a cylinder 12 with a first mount 14, a piston 16 received within the cylinder 12, and a rod 18 coupled to the piston 16. The rod 18 defines an axis A that extends along a length of the rod 18. The rod 18 moves the piston 16 back and forth within the cylinder 12 along the axis A to compensate for road load inputs as known.

A second mount 20 is attached to the rod 18. The second mount 20 is attached to a vehicle structure 22, such as a frame or chassis member for example. The first mount 14 is attached to a wheel structure 24, such as control arm for example. A reverse orientation could also be used with the first mount 14 being attached to the vehicle structure 22 and the second mount 20 being attached to the wheel structure 24. Further, the first 14 and second 20 mounts can be pivoting mounts as shown in FIG. 1, or could be a fixed mount such as that shown in FIG. 2A.

A first support or spring seat 30 is fixed to the cylinder 12 as shown in FIG. 1. A second support or spring seat 32 is fixed to the rod 18. The first spring seat 30 is preferably mounted directly to an exterior surface of the cylinder 12. The second spring seat 32 is preferably fixed to a portion of the rod 18 that extends outwardly of the cylinder 12, and which is positioned near the second mount 20.

A spring 34 reacts between the first 30 and second 32 spring seats. The spring 34 has a first coil end 36 that is associated with the first spring seat 30 and a second coil end 38 that is associated with the second spring seat 32.

An isolator 40 is positioned between each of the first 36 and second 38 coil ends and a respective one of the first 30 and second 32 spring seats. Optionally, only a single isolator 40 may be positioned at either of the first 30 and second 32 spring seats. The isolator 40 provides a sealed fluid cavity that is filled with any suitable fluid, such as hydraulic fluid for example. Further, it should be understood that while the isolator 40 is shown in a shock absorber 10, the subject invention could also be utilized as a clip-on component to make a spring/isolator assembly.

The isolators 40 serve as a mechanism for evenly distributing non-centered spring forces, such as spring side loads for example, throughout a fluid medium resulting in generation of an internal pressure within the isolator 40. The internal pressure within the isolator 40 results in an axial force being applied against an associated spring seat (see FIG. 2A), which significantly reduces side load forces.

Figures 2A, 2B:
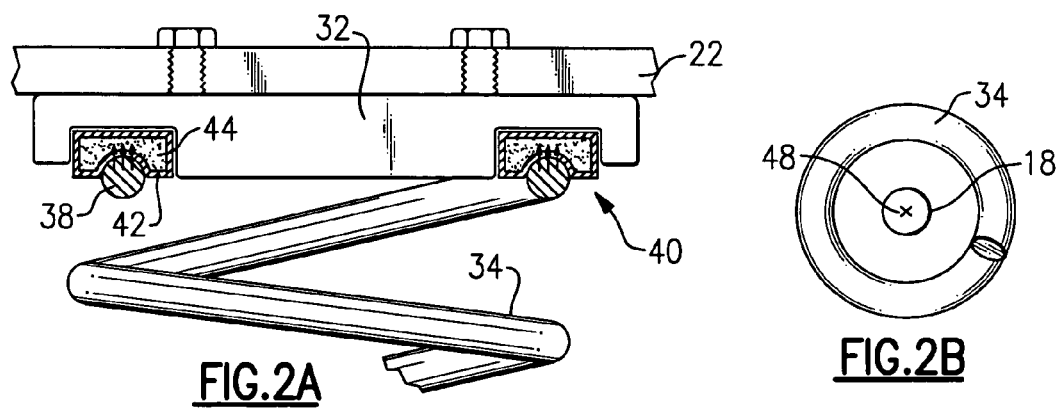
FIG. 2A is a cross-sectional side view of one embodiment of the subject invention.
FIG. 2B is a schematic top view of the configuration of FIG. 2B showing a spring pierce point being concentric with a piston rod.

In the example shown in FIG. 2A, the isolator 40 is installed between the second spring seat 32 and the second coil end 38. A similar isolator would be positioned between the first spring seat 30 and first coil end 36 if needed. In this example, the isolator 40 comprises an annular ring 42 with an internal cavity 44 that is completely enclosed within the annular ring 42. Fluid at least partially fills the internal cavity 44. During vehicle operation, the annular ring 42 can resiliently respond to non-centered spring forces by compressing or expanding sections of the annular ring 42.

The isolator 40 allows the second spring seat 32 and second coil end 38 to move relative to each other to compensate for these non-centered spring forces. This allows the center of load or "spring pierce point" 48 (FIG. 2B) at the first spring seat 30 to be continuously adjusted. The resiliency of the isolator 40 allows the spring pierce point 48 to be actively maintained in a generally concentric relationship with the rod 18, i.e. the isolator 40 generally positions the spring pierce point 48 along the axis A. This reduces the effects of side loading forces.

In the example shown in FIGS. 3A-3B, an isolator 50 comprises an annular ring similar to that of FIG. 2A, and has a generally toroidal shape when not subjected to a load (FIG. 3A). When the isolator 50 is subjected to a load (FIG. 3B), the isolator 50 assumes a generally rectangular cross-sectional shape. Any angular motion as allowed by various component clearances within the shock absorber 10, would result in an internal pressure within the isolator 50. This would exert a vertical load against the isolator 50 as shown by the arrow in FIG. 3B. Optionally, a reaction member, such as a washer 52 or stamped ring, could be used to more evenly transfer loading from the second coil end 38 to the isolator 50.

In the example shown in FIG. 4, an isolator 60 comprises an annular ring similar to those described above, but includes a spring interface 62 that is integrally formed with the isolator 60. The spring interface 62 preferably comprises a groove that is formed in a lower surface 64 of the isolator 60.

In the example shown in FIG. 5, an isolator 70 comprises an annular ring similar to those described above, but includes a locating or piloting ring 72. The piloting ring 72 is preferably a stamped metal ring that extends transversely relative to the isolator 70 and surrounds at least a portion of an outer circumference of the second coil end 38.

The example shown in FIG. 6 discloses an isolator 80 that uses features from the examples of FIG. 3B and FIG. 5. The isolator 80 uses a reaction member 82 that includes a first portion 84 that is similar to the washer 52 of FIG. 3B, and which is used to evenly distribute loads to the isolator 80. The reaction member 82 also includes a second portion 86 that is similar to the piloting ring 72 of FIG. 5. The second portion 86 extends transversely to the first portion 84, and can be integrally formed with or separately formed from the first portion 84.

FIGS. 7-10 disclose another type of fluid isolator. In these embodiments, a sealed fluid cavity is formed between one of the spring seats and the fluid isolator. In the example shown in FIG. 7, an isolator 90 comprises an annular ring with an upper surface 92 that defines a portion of a sealed cavity 94. At least one sealing bead 96 is circumferentially formed about the annular ring to engage the second spring seat 32. The sealing bead 96 is similar to a tire bead that is formed on a vehicle tire for engagement with a wheel rim. The sealing bead 96 is compressed under pressure against inner walls of the second spring seat 32 to form the sealed cavity 94.

This isolator 90 performs similarly to those described above, and allows the relative movement, i.e. tilting movement for example, between the second coil end 38 and second spring seat 32. This tilting movement neutralizes natural spring loads and off-center spring pierce points.

Figure 8:
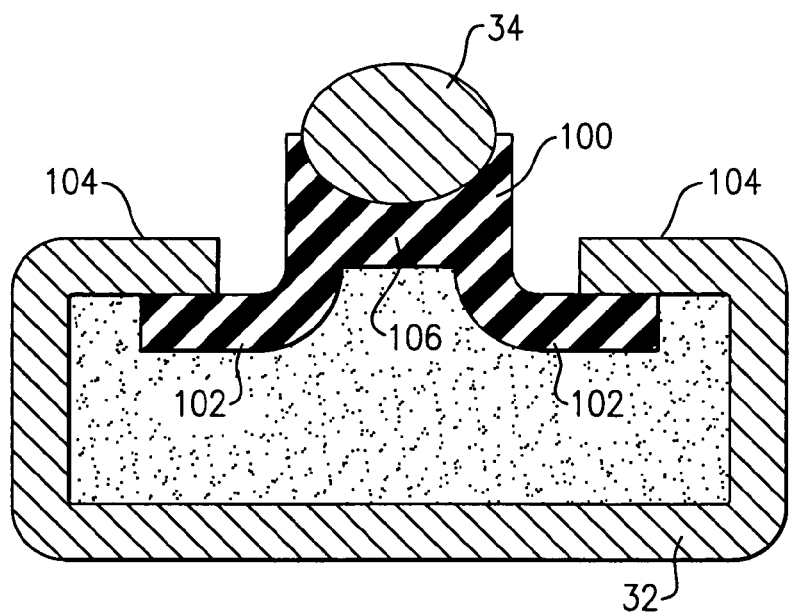
FIG. 8 is a schematic view, shown in partial cross-section, of another embodiment of the subject invention.

In the example shown in FIG. 8, an isolator 100 includes horizontally extending flanges 102 with sealing beads that engage inwardly extending walls 104 of the second spring seat 32. The isolator 100 includes an integrally formed spring interface 106 as shown.

Figure 9:
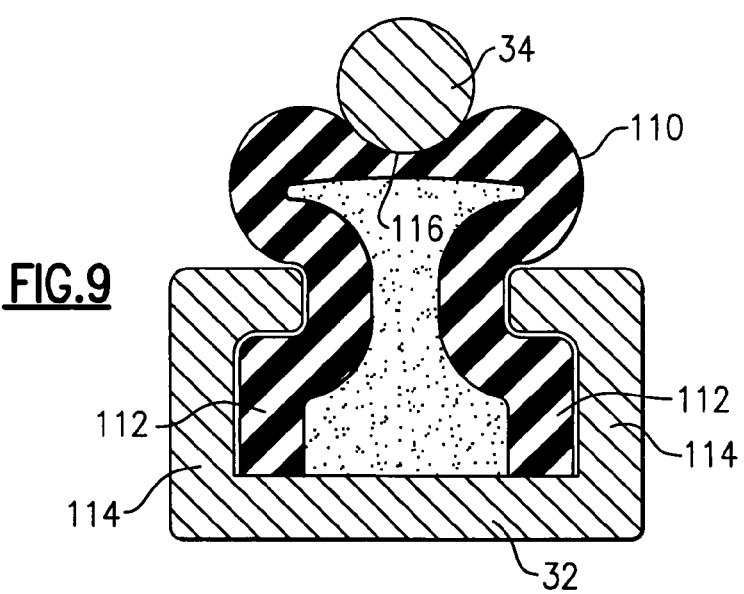
FIG. 9 is a schematic view, shown in partial cross-section, of another embodiment of the subject invention.

In the example shown in FIG. 9, an isolator 110 includes vertically extending flanges 112 with sealing beads that engage vertical walls 114 of the second spring seat 32. The isolator 110 includes an integrally formed spring interface 116 as shown.

Figure 10:
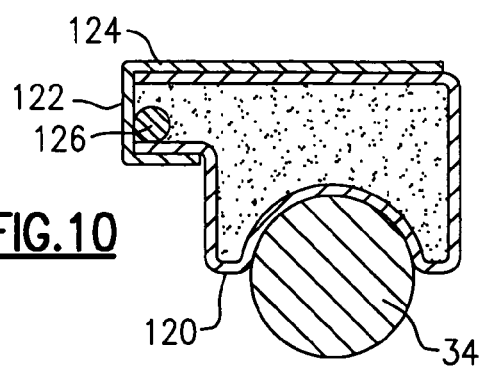
FIG. 10 is a schematic view, shown in partial cross-section, of another embodiment of the subject invention.

In the example shown in FIG. 10, an isolator 120 cooperates with a roll crimped edge 122 of a spring seat 124. This provides integral attachment of the isolator 120 to the spring seat 124 with the crimped edge 122 being formed around a beaded section 126 to offer a hydraulic type seal.

Under non-uniform spring end loading, the fluid in each of the isolators described above relocates itself from areas of high force to areas of low force through the entire travel of the spring 34. This allows a spring pierce point to be brought/maintained closer to a center of the shock, i.e. to be generally concentric with rod 18, in all positions.

By reducing the effects of side loads, a smaller shock absorber can be utilized to offset any cost associated with the inclusion of the isolator. For example, the size of the rod 18 could be reduced, the wall thickness of the cylinder could be decreased, and/or lower capacity bearings/seals could be realized. Any of these would provide reduced costs and weight of the assembly. Further, lower side loads also reduce friction between the rod and associated bearings/seals, resulting in an improved vehicle ride.

In each of the embodiments shown, the spring seats are preferably formed from a steel material and the isolator is preferably formed from an elastomer material, such as rubber for example. In any of the embodiments shown, internal fluid pressures are moderately low, i.e. in the general range of 2000-3000 psi. This pressure range corresponds to existing hydraulic pressures through traditional rubber hose technology.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A vehicle shock absorber assembly comprising:
a cylinder having a first mount:
a rod having a first rod end coupled to a piston received within said cylinder and a second rod end having a second mount wherein one of said first and second mounts is adapted for attachment to a vehicle wheel and the other of said first and second mounts is adapted for attachment to a vehicle frame;
a spring reactor between a first spring seat fixed to said cylinder and a second spring seat fixed to said rod, said spring having a first end coil and a second end coil;
at least one isolator positioned between one of said first and second spring, seats and said spring, said at least one isolator comprising an annular ring having an internal cavity at least partially filled with fluid to actively compensate for spring side loads by distributing non-centered spring forces throughout the fluid; and
at least one reaction member positioned between at least one of said first and second end coils and said annular ring.

2. The vehicle shock absorber assembly according to claim 1 wherein said at least one reaction member comprises a washer.

* * * * *